United States Patent [19]
Axline, Jr. et al.

[11] Patent Number: 5,486,830
[45] Date of Patent: Jan. 23, 1996

[54] RADAR TRANSPONDER APPARATUS AND SIGNAL PROCESSING TECHNIQUE

[75] Inventors: Robert M. Axline, Jr.; George R. Sloan; Richard E. Spalding, all of Albuquerque, N.M.

[73] Assignee: The United States of America as represented by the United States Department of Energy, Washington, D.C.

[21] Appl. No.: 223,799

[22] Filed: Apr. 6, 1994

[51] Int. Cl.$^6$ .................................................. G01S 13/74
[52] U.S. Cl. ............................................................. 342/43
[58] Field of Search ................................. 342/42, 43, 44, 342/50, 51

[56] References Cited

U.S. PATENT DOCUMENTS 4,786,906  11/1988  Krogager .................................. 342/25
4,839,658  6/1989  Kathol et al. ............................. 342/30

OTHER PUBLICATIONS

Williamson et al., "A Coded Radar Reflector For Remote Identification of Personnel and Vehicles", *The Record of the 1993 IEEE National Radar Conference*, 1993, pp. 186–191.

*Primary Examiner*—Daniel T. Pihulic
*Attorney, Agent, or Firm*—Luis M. Ortiz; James H. Chafin; William R. Moser

[57] ABSTRACT

An active, phase-coded, time-grating transponder and a synthetic-aperture radar (SAR) and signal processor means, in combination, allow the recognition and location of the transponder (tag) in the SAR image and allow communication of information messages from the transponder to the SAR. The SAR is an illuminating radar having special processing modifications in an image-formation processor to receive an echo from a remote transponder, after the transponder receives and retransmits the SAR illuminations, and to enhance the transponder's echo relative to surrounding ground clutter by recognizing special transponder modulations from phase-shifted from the transponder retransmissions. The remote radio-frequency tag also transmits information to the SAR through a single antenna that also serves to receive the SAR illuminations. Unique tag-modulation and SAR signal processing techniques, in combination, allow the detection and precise geographical location of the tag through the reduction of interfering signals from ground clutter, and allow communication of environmental and status information from said tag to be communicated to said SAR.

33 Claims, 4 Drawing Sheets

RADAR TRANSPONDER APPARATUS AND SIGNAL PROCESSING TECHNIQUE

The present invention was conceived and developed in the performance of a U.S. Government Contract. The U.S. Government has rights in this invention pursuant to Contract No. DE-AC04-76DP00789, with American Telephone & Telegraph Company.

FIELD OF THE INVENTION

The present invention relates generally to the combination of radio-frequency (rf) tagging concepts with an airborne or spaceborne synthetic-aperture radar (SAR). More specifically, the invention is directed to radar transponders which receive, modulate, and retransmit pulses transmitted by a SAR wherein the radar transponder, after special processing of the transponder's echo by the SAR's image-formation processor, can be discerned in a SAR image, can be used as a precise location marker at a fixed position on the earth's surface, and can communicate status or other information back to the illuminating SAR.

BACKGROUND OF THE INVENTION

Tagging for object location and command-control-and-communications has potential applications in the areas of arms-treaty verification, battlefield management, precision strike, intelligence gathering, terrain mapping, and emergency response. Synthetic-aperture radar (SAR) has a variety of uses, including surveillance and as the prime sensor for locating and identifying targets. A standard SAR creates a reflectivity map, or image, of the illuminated target area. Image resolution cells one meter on a side and cross-track image swaths of the order of thousands of pixels in extent are readily achievable using current SAR technology. Target features, or patterns, appearing at various places in the image can be located, or positioned, relative to one another, to within a fraction of tile dimension of a resolution cell.

SAR transponders are sometimes placed in the imaged scene to serve as reference targets of known reflectivity, position, and/or polarization. Standard SAR transponders normally retransmit pulses with no modulation; therefore the transponder's echo pattern in the SAR image must compete with all other natural and cultural target clutter, which makes difficult the task of recognizing the transponder and determining its true geographic location within the context of other scene features. The fact that no modulation is used increases the transmit power requirements for the transponder in order to overcome background noise. Most SAR transponders do not send information back to the SAR. Those that do send information back to tile SAR also suffer from the effects of clutter from natural and cultural targets. Finally, standard transponders require two rf antennas, one to receive tile impinging radar pulse and one to retransmit tile echo pulse.

Increased power requirements and the need for two antennas cause standard transponders to be large in size; this limits the number of system applications in which they can be used. A number of overt and covert applications are apparent for light-weight, low-power transponders that can be commanded and precisely located using remote sensors, such as SAR, and that can send status information back to the sensor.

Thus, there is a need for a concept that enhances the transponder's echo relative to the surrounding ground clutter by use of special transponder modulation from a transponder in combination with special SAR signal-processing techniques at the SAR. Such enhancement will allow smaller, lower-power transponders to be built and easily deployed in a variety of application scenarios. Second, there is a need for a method that allows reliable, low-power communication of status information from the transponder to the illuminating SAR. Third, there is a need for simple compact construction of a transponder having only one antenna.

The present invention overcomes the shortcomings not yet addressed by the prior art by providing a novel, active (battery-powered), phase-coded, time-gating transponder and novel SAR signal-processing methods that, in combination, allow recognition and location of the transponder in the SAR image, allow communication of information messages from the transponder to the SAR, and allow the transponder to be constructed with only one antenna. The present invention fulfills the need for a radar transponder concept and SAR signal-processing techniques that enhance the transponder's echo relative to the surrounding clutter or noise. Said concepts and techniques allow the true geographical location of the transponder relative to other features in the scene to be revealed in the SAR image and allow reliable, low-power communications from the transponder to the SAR. The time-gating feature of the present invention, to be described in more detail below, provides a method for making the transponder's transmitting and receiving time intervals mutually exclusive. In this way, the transponder's transmitted echo does not interfere with that same transponder's receiver. This feature allows the transponder to be constructed using only one antenna.

SUMMARY OF THE INVENTION

In view of the above-described needs, it is an object of the present invention to provide a combination of tagging concepts using a transponder together with a SAR. To achieve the foregoing and other objects and in accordance with the purpose of the present invention, as embodied and broadly described herein, there is provided the radar transponder of the present invention which receives, modulates, time-gates, and retransmits pulses originally transmitted by a synthetic-aperture radar (SAR).

The transponding apparatus of the present invention has an illumination signal receiving means for receiving an illuminating signal from a SAR. A phase modulating-signal conditioning means is provided within the transponder for phase-shifting the illuminating signal into a phase-shifted transponder signal after it is received by the transponder. The transponder transmits the phase-shifted signal via a transmitting means to the SAR. The transponding apparatus is capable of amplitude-gating and phase-coding its echo with a number of prescribed and/or informational pulse sequences for retransmission to the SAR.

In another embodiment of the transponder, also herein called an rf tag, or simply a tag, a single rf antenna is utilized by the tag to transmit and receive signals. The single antenna provides a simpler, more compact design for the tag, therefore allowing the tag to be versatile in its applications. Prior to retransmitting signals, rf receiver amplifiers and filters condition the signal received by the tag. A received-signal detector is utilized to determine the presence and arrival time of an impinging radar pulse. Rf time-delay and transmitter/receiver signal-gating devices allow the use of the single rf antenna design. A bi-phase (0/pi) modulator is provided to allow selective inversion of the signal before retransmitting pulses. Transmitter amplifiers and filters condition the outgoing signal. Logic circuitry within the tag controls transponder timing and switching, decodes commands from the SAR, achieves timing synchronization with the SAR, and encodes prescribed pulse sequences and response information bits to be sent from the tag to the SAR. In its simplest form the invention is an rf repeater that amplifies and phase-innoculates the signal returned to the SAR. Amplification at the tag must be adequate to give the tag fine needed radar cross section to allow it to be distinguished in the SAR image.

A further embodiment of the invention provides an improved synthetic-aperture radar (SAR). The tag, after special processing by the SAR's signal processor, can be discerned in a SAR image and can be used as a precise location marker at a fixed position on the earth's surface. The novel clutter-reduction scheme, which is a key feature of the present invention, allows power and weight requirements of the tag and its antenna to be reduced. A novel means for receiving status information sent from the tag to the SAR is also provided. By examination of the pseudo-image, the position of a particular tag can be determined in relation to positions of other tags also appearing in the pseudo-image. By virtue of the fact that a normal SAR image of the target scene can also be formed from the same aperture of pulses as was the pseudo-image, the position of a particular tag can also be determined in relation of cultural or natural targets appearing in the normal SAR image.

Two basic modes of operation are defined for tile tagging system of tile present invention: 1) geographical-location (geo-location) mode and 2) uplink-communications mode. During operation in geo-location mode, the tag device described herein is capable of phase-coding its echo with one or more prescribed periodic or pseudo-random sequences. A simple, but novel, variation of standard SAR image-formation processing produces a "pseudo-image" in which the tag can appear as a single, bright dot, in its proper geometric position, while other competing point-like scatterers in the target area are diffused, more-or-less uniformly, across the azimuth dimension of the pseudo-image. In the case where the SAR over-samples the Doppler spectral content of the scene, the SAR's pulse repetition frequency (prf) is higher than the minimum value necessary to image the scene viewed by the SAR's antenna, and the SAR is said to possess excess prf. In this event, the phase-coded modulation scheme employed at the tag and the novel signal-processing schemes implemented at the SAR can be viewed as a spread-spectrum technique, wherein a major portion of the pseudo-image clutter power can be rejected instead of just being redistributed throughout the image. This rejection of image clutter enhances the signature of the tag in the pseudo-image and allows it to be more easily discerned. It is possible for multiple tags, using the same synchronized phase code, to simultaneously appear in their respective locations within the pseudo-image.

In order to initially detect one or more tags in the image scene and determine their locations, the signal-processing scheme applied to the pulses received by the SAR is as follows. A modulation sequence identical to that used by the transponder is mixed with (multiplied by) the echoes; this mixing, followed by normal SAR image-formation processing using a finite, prescribed aperture of echo pulses, provides matched-filter processing of the transponders' echo. On a normal SAR image, return from natural and cultural targets would dominate, and the transponders' echo might not be visible in the image. By matching SAR processing to the transponders' prescribed modulation, normal clutter can be deemphasized, or suppressed, thus allowing the transponders' echo to be more easily discerned.

In uplink-communications mode, the tag device phase codes its echo with a sequence containing both prescribed periodic or pseudo-random patterns and, in addition, status or information unknown to the SAR's signal processor. As in geo-location mode, signal processing at the SAR mixes a sequence identical to the prescribed periodic or pseudo-random code against the received echoes. Said mixing spreads the spectrum of natural or cultural echoes and de-spreads the tag's echo, leaving only a low-rate information sequence in the tag echo. Following the ,nixing operation, a range-compression operation separates the received echo into range bins. The information, or message, sent by the tag is then revealed following azimuth-dimension correlation processing of echoes corresponding to range bins in which the tag echo is known to reside, the position of the tag having been previously determined in geo-location mode.

Additional objects, advantages, and novel features of the invention will become apparent to those skilled in the art upon examination of the following description or may be learned by practicing the invention. The objects and advantages of the invention may also be realized and attained by means of the instrumentalities and combinations particularly pointed out in the appended claims.

DESCRIPTION OF THE DRAWINGS

The accompanying drawings, which are incorporated into and form part of this specification, illustrate embodiments of the present invention and, together with the description, in which like numerals refer to like elements, serve to explain the operation, features and advantages of the present invention where.

DETAILED DESCRIPTION OF THE INVENTION

Figure 1:
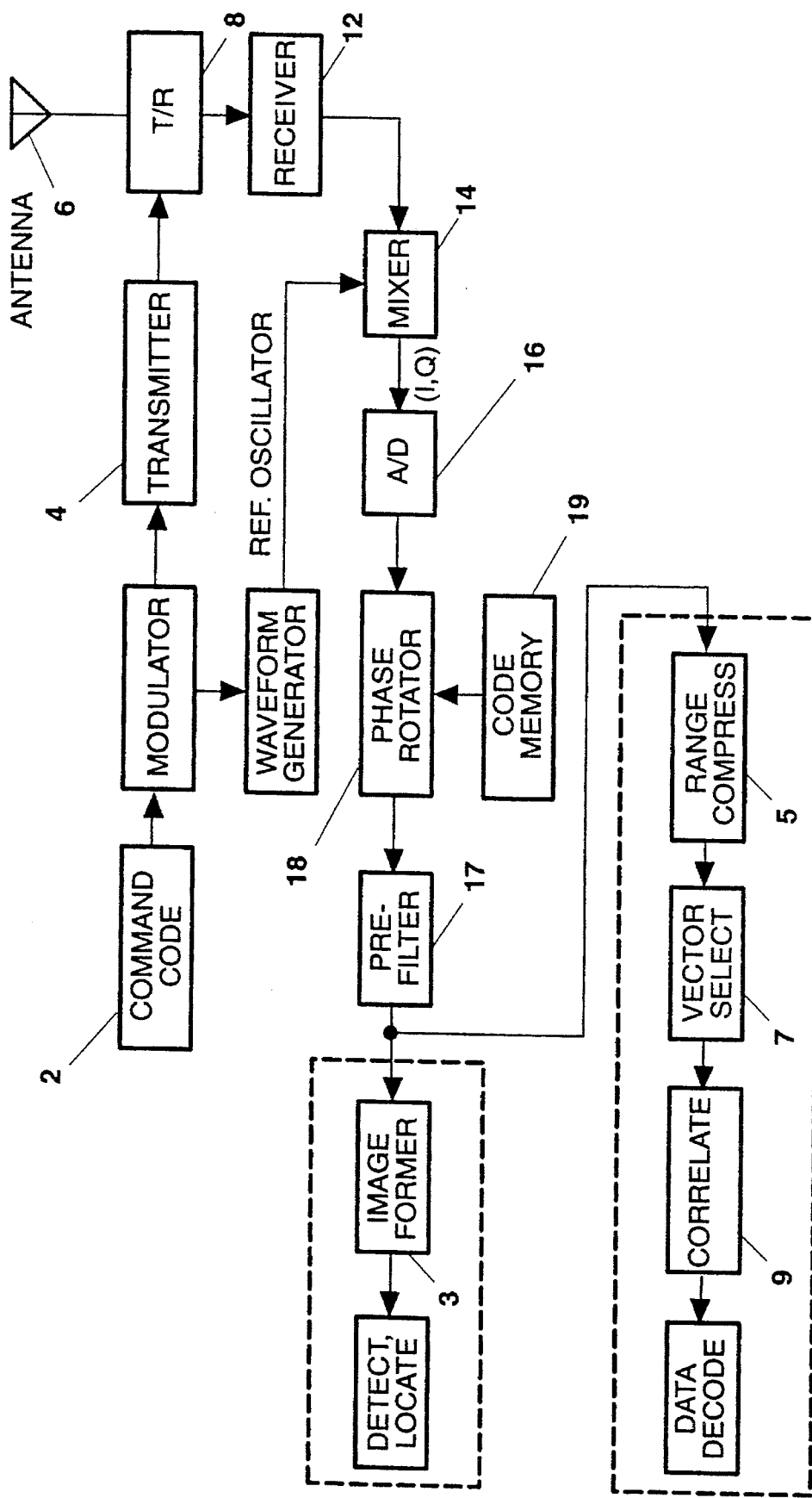
FIG. 1 is a block diagram of an imaging SAR system compatible with and containing implementations of several elements of the present invention.

A block diagram of an airborne or spaceborne imaging SAR system suitable for use in the present invention is given in FIG. 1. The SAR 10 generates rf pulses of specific bandwidth and centered at a specific center frequency. To implement the downlink communications function (SAR-to-tag), the SAR's transmitted pulses are initially pulse-position modulated with a command code 2 to provide a means of synchronizing the timing of the SAR 10 and the tag (shown at FIG. 2). This command code 2 is only used during the initial synchronization interval; thenceforth, no command coding is encoded into the SAR transmitted pulses, and the SAR is operated at a constant pulse repetition frequency (prf). The transmitted pulses, which are of finite duration (tens of microseconds duration is typical), are amplified in the SAR transmitter 4 and radiated from the SAR's antenna 6 toward the area on the ground to be imaged.

The SAR's antenna 6 receives the echo (rf energy reflected from the scene to be imaged) on each pulse and passes it, through a transmit/receive (T/R) switch 8, to the receiver 12, where it is filtered and amplified. The echo signal spectrum on each pulse is then translated to baseband (centered about the frequency zero Hz) via a quadrature mixing operation 14. The mixing operation produces in-phase and quadrature (I and Q) baseband channels. Both I and Q channels are digitally sampled 16, and echo samples on each pulse are sent, through a controllable phase-rotation device 18, to the pre-filter 17. In the novel signal-processing technique described herein, the phase rotator 18, driven by the code memory 19, is used to remove all of the pulse modulation sequence imparted by the tag to its echo in geological location (geo-location) mode and portions of the pulse modulation sequence in uplink-communications mode. If all ordinary SAR image is to be formed, the phase rotator 18 performs no phase rotations of the data. The pre-filter 17 individually sums I and Q sample values over a number of adjacent radar pulses.

For the geo-location mode, output samples from the pre-filter 17 are then sent to the image-formation processor 3, where the SAR image is created by performing two-dimensional (range and azimuth) mathematical transforms on the raw echo I and Q samples. A number of different image-formation techniques are possible. For the function of the present invention involving initial detection and geo-location of the tag, the phase rotator 18 and code memory 19 wholly embody the novelty of the signal processing method, and any standard image-formation algorithm known in the art could be used compatibly. For the function of the present invention involving subsequent communication of uplink information from the tag to the SAR, an alternate method of signal processing is required.

For the latter function, the phase rotator 18, driven by the code memory 19, performs a portion of the novel processing. In subsequent novel processing, the range-dimension transformation, or compression 5 of the two-dimensional echo-data matrix, must be performed first. Next, range-cell data vectors, one for each known tag location, are selected 7 from the two-dimensional echo-data matrix. Finally, correlation processing 9 is used to extract the uplink information.

Figure 2:
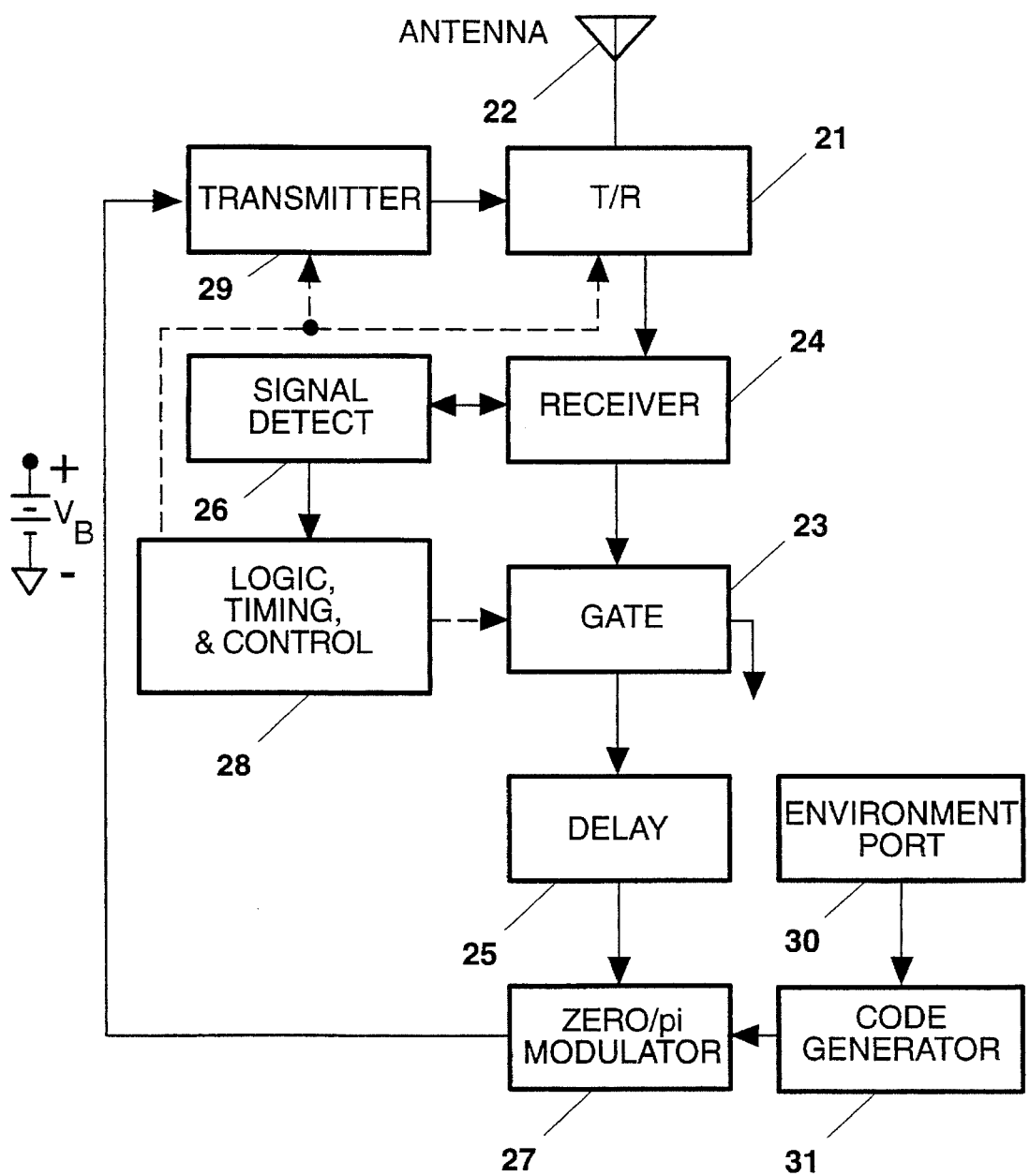
FIG. 2 is a block diagram of the transponder device of the present invention.

FIG. 2 shows the novel tag device 20 capable of decoding downlink SAR commands and of phase-coding its echo with the prescribed pulse sequences and information data required to implement the geo-location and uplink-communications modes. A short time after the SAR transmits a pulse, that pulse is received by the tag's single antenna 22 where it passes through the transponder's transmit/receive (T/R) switch 21, to the receiver 24 where it is filtered and amplified. After the pulse is filtered and amplified in the tag's receiver 24 it is detected by the signal detector 26. The transmit/receiver gating scheme provided by the T/R switch 21 and the gate 23 allows the use of a single antenna 22 by the tag. Tag logic and timing circuitry 28 measures the time between detected pulses and decodes downlink commands from the SAR, symbols of which are encoded in the spacing between SAR pulses. Commands contain mode information and allow the SAR and tag to obtain a common pulse index (coarse synchronization).

Once the downlink command has been received and coarse synchronization with the SAR's prf accomplished, the SAR switches to a constant prf rate, and the tag processes a number of pulses at constant prf rate in order to become more finely synchronized to that prf rate. Although system clocks in the SAR and the tag are not initially closely synchronized, the tag achieves fine-scale synchronization of an internal clock with the prf of the SAR. This occurs after coarse, prf-scale synchronization, but before the tag begins imparting modulation to echo pulses. Fine synchronization is achieved at the tag by averaging the measured time-of-arrival of a number of SAR pulses and is accomplished using the signal-detect 26 and logic, timing, and control 28 portions of the tag 20. After fine synchronization has been achieved, the tag 20, if so commanded, will go into the geo-location mode.

In geo-location mode, the received radar pulse passes through a time-gating circuit 23 and into a time-delay device 25. During the time interval (denoted as $T_g$) the received signal is being gated into the time-delay device 25, the tag transmitter 29 is defeated. The length of the delay is chosen to be equal to $T_g$. The interval $T_g$ is chosen to be only a fraction of the width of the transmitted radar pulse. At the end of the gating interval (i.e., after $T_g$ seconds), the delay-device 25 input is grounded, and the tag transmitter 29 is turned on. During the transmission time, the signal stored in the delay line 25 is fed to the transmitter 29 through a bi-phase modulator 27, which impresses on the signal the geo-location phase code and where the signal is amplified, and finally through the T/R switch 21 to the antenna 22 to be radiated back to the SAR. The transmitter 29 is left on for a time equal to $T_g$, after which time the transmitter 29 is turned off, and the delay-device 25 input is reactivated. The cycle is repeated until the impinging SAR pulse has ended. The hi-phase modulator 27 phase state is held constant over the duration of the SAR pulse. After the pulse ends, the phase state is changed to the next state in the pulse sequence in anticipation of arrival of the next SAR pulse. The tag 20 will transmit for a finite number of pulses and then begin looking for the next SAR command.

When the tag 20 is commanded by the SAR into uplink-communications mode, the tag function will be very similar to its function in geo-location mode; however, the pulse sequence sent back to the SAR will be different in that it will contain status or other information available to the tag via its environment port 30. Data available at the environment port 30 may relate to state-of-health, location, or status of the tag or of an entity to which the tag 20 is attached. This information together with identification information is assigned a signal at the code generator 31 after which the information is transmitted through the 0/pi modulator 27 and transmitter 29 to the SAR 10 through the antenna 22.

Figure 3:
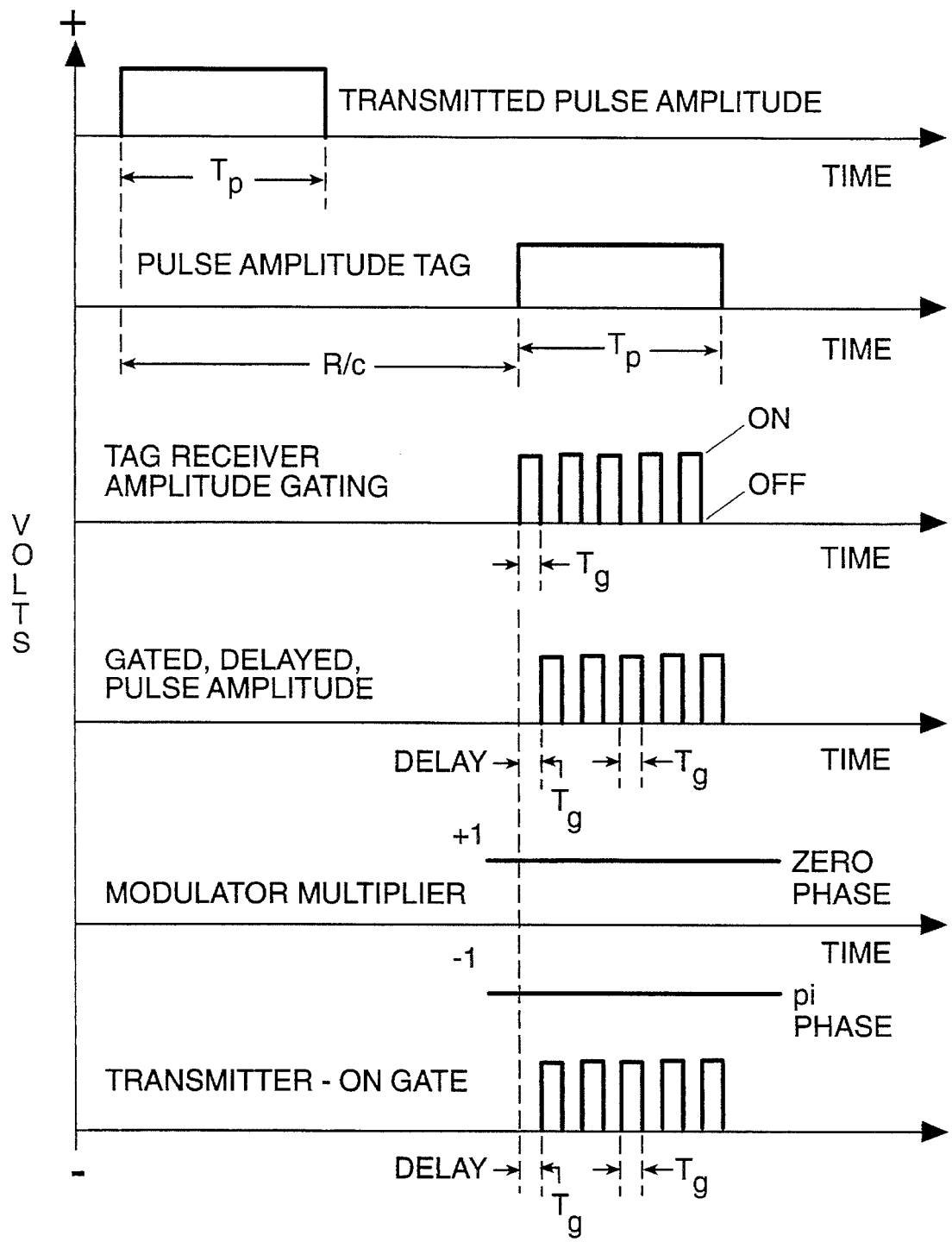
FIG. 3 is a timing diagram showing transmission, reception, time-gating, delay, modulation, and retransmission of a single radar pulse.

FIG. 3 shows what happens to a single SAR pulse as it is transmitted and subsequently modified and retransmitted by the tag 20. In this discussion, it is assumed that a downlink command has already been decoded by the tag, that coarse and fine synchronization have been achieved, and that the tag is responding in either geo-location mode or uplink-communications mode. The transmitted pulse, of length $T_p$, arrives at the tag a time R/c after it leaves the SAR antenna 6. Here, R is the range from the SAR to the tag, and c is the speed of light, approximately 300 million meters per second. The transmitted pulse has a particular pulse bandwidth and center frequency. The tag receiver 24 has sufficient bandwidth to pass all energy in the received pulse.

Once fine synchronization has occurred, the tag 20 can reliably predict the arrival time of pulses from the SAR 10. Pulses to be modulated and retransmitted are first gated into the delay device 25 using periodic, on/off gating. The tag aligns the rising edge of the first on-gate with the predicted time-of-arrival of the current SAR pulse. As explained previously, square-wave gating into the delay with a 50% duty factor is employed. The gating continues for the duration of the incoming pulse. The amplitude of the gated, delayed received pulse is also shown. The effect of the modulator 27 is to multiply the gated 23, delayed 25 pulse by either +1 or −1, depending upon the code state dictated by the tag's code generator 31 (FIG. 2). The transmitter-on gate is complementary to the receiver gate 23 at the time-delay 25 input and synchronous with the gated, time-delayed pulse wave-shape at the output of the time delay 25. In this way, the tag retransmits only those portions of the received pulse that were gated into the delay device 25.

Figure 4:
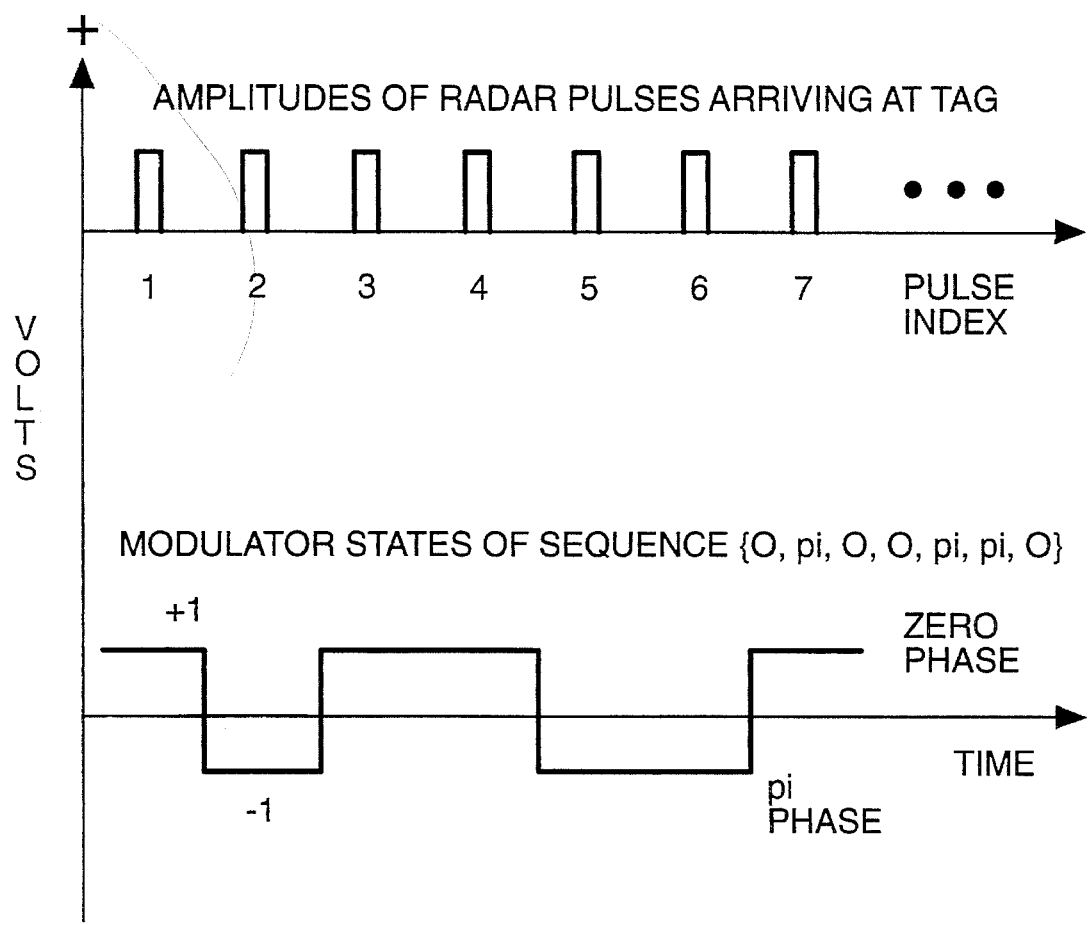
FIG. 4 is a diagram showing tag modulation of a sequence of pulses.

FIG. 4 shows a prescribed phase-code modulation sequence being applied to a series of seven received pulses. The diagram is applicable to either geo-location or uplink-communications modes. The seven elements shown of the prescribed sequence are {0,pi,0,0,pi,pi,0}. On each pulse, the modulator phase state is set up prior to the onset of the next pulse and held constant for the full duration of the incoming pulse.

In geo-location mode, the SAR and tag have common knowledge of the prescribed phase-code sequence to be imparted to the retransmitted echo by the tag. Because the SAR and tag have established a common pulse index during the coarse synchronization operation, the SAR can predict the phase state imparted to each pulse by the tag. The signal-processing method of the current invention consists of demodulating each pulse returned to the SAR according to the prescribed sequence. That is, the SAR's phase rotator 18 (FIG. 1) performs the same multiplication to each received pulse that the tag performed during its modulation operations. Therefore, for the above-stated seven-pulse example sequence, the phase rotator would follow the sequence {0,pi,0,0,pi,pi,0} for the corresponding pulses.

The effect of this demodulation is to realign the pulse-to-pulse phases of those portions of the total echo attributable to the retransmitted pulses of transponding tags in the illuminated image scene and to misalign the pulse-to-pulse phases of those portions of the echo attributable to stationary cultural or natural targets in the image scene which generate clutter or noise. Therefore, the demodulation has the effect of collapsing or narrowing the Doppler frequency spectrum of the tag echoes and has the effect of spreading the Doppler frequency spectrum of normal targets. In the case where the radar possesses excess prf, the pre-filter 17 (FIG. 1) is normally configured to sum corresponding samples of adjacent radar pulses in order to increase signal-to-noise ratio and narrow the Doppler frequency spectrum. In this way, the pre-filter 17 rejects echo energy residing at large positive and large negative Doppler frequencies. The above-described demodulation performed by the phase rotator 18 allows all energy from the tag 20 to pass through the pre-filter 17 unattenuated and allows very little of the energy from cultural and natural targets to pass through the pre-filter.

Because the demodulation performed by the phase rotator 18 causes the tag's echo to appear identical to that of an ideal point reflector located at the tag's geographic position, normal image-formation processing of the demodulated echo results in the tag appearing as a focused dot in the pseudo-image product as displayed on a screen. By contrast, the demodulation process decomposes and attenuates the pseudo-image of ordinary clutter. This allows the focused dots representing the tags to stand out in the pseudo-image, and it causes the normal clutter to appear as a relatively dark, featureless background.

The pseudo-image and normal SAR image can be formed using disjoint, adjacent apertures of pulses. Alternatively, the pseudo-image and normal SAR image could be formed using the same aperture of pulses. However, this latter approach would require two pre-filters and twice the image-formation computational power.

A variety of types of modulation sequences can be used effectively in geo-location mode. The simplest sequence is the sequence {0,pi,0,pi,0,pi, . . . }, which is periodic with a frequency of one-half of the prf. A periodic, pseudo-random sequences are also appropriate for use in this mode. The primary criterion for the sequence is that said sequence must, after the demodulation operation performed by the phase rotator, cause the predominate portion of the energy of the normal clutter to appear at Doppler frequencies that lie outside the frequency passband of the pre-filter.

In the uplink communications mode, information is embedded in the tag's echo pulses. The modulation sequence sent by the tag is composed of the product of two sequences, a high-rate, prescribed sequence, {H}, known to the SAR's signal processor, the phase states of which may change at as high a rate as the prf, and a low-rate information sequence, {I}, the phase states of which change every $N_p$ pulses, where $N_p$, is the integer number of pulses combined in the SAR's pre-filter to produce what is called one azimuth sample. Thus, for an aperture of echo pulses containing $N_a$ pulses, the sequence {H} will be a sequence of $N_a$ prescribed phase states, one for each radar pulse, and {I} will be a sequence of $N_a/N_p$ phase states, one for each $N_p$ radar pulses, or, equivalently, one for each azimuth sample. The criterion used to select {H} is the same as was used to select the code sequence used in geo-location mode.

In the uplink-communications mode, the prescribed sequence {H} is stored in the SAR's code memory 19, and the phase rotator 18 is used to remove the sequence {H} from echoes of transponding tags in the illuminated scene. Removal of {H} from the tag echoes leaves only the information sequence {I} and normal Doppler frequency variations remaining in the tag echoes. At the same time, demodulation using the sequence {H} spreads the pulse-to-pulse spectrum of echoes from natural and cultural clutter. The tag echoes, which contain only the phase variations of the low-rate sequence {I}, and those due to normal target Doppler, will pass through the pre-filter 17 unattenuated. The echoes due to natural and cultural clutter, now containing the phase variations of the high-rate sequence, {H}, as well as those of normal target Doppler, will suffer significant attenuation in the pre-filter 17.

Decoding of the uplink information is synonymous with determining the unknown sequence {I} sent by the tag. This determination is made in the following way. Define the two-dimensional echo-data matrix at the output of the pre-filter to be $[E_{ij}]$ wherein i is the azimuth-sample index, advancing across the aperture from 1 to $N_a/N_p$, and j is the index of digital samples pertaining to a particular azimuth sample and advancing across that pulse from 1 to an integer value $N_s$.

The next processing step consists of a standard range-dimension pulse compression, performed along the j-index. This is done using a fast Fourier transform operation. Resulting from this compression is the range-compressed two-dimensional data matrix, $[C_{ik}]$, wherein i is the azimuth-sample index, advancing across the aperture from 1 to $N_a/N_p$, and k is the range-bin index pertaining to a particular azimuth sample and advancing in range from 1 to $N_s$ or an integer of the order $N_s$. (The standard range compression described above produces range-compressed samples for all range cells on each azimuth sample. The range-compression processing could, in fact, be greatly simplified because only those range cells corresponding to known locations of the transponding tag or tags detected in the geo-location mode are needed in order to determine the uplink data sent by the tag or tags.)

Next, advantage is taken of the knowledge of the location of the tag or tags detected and located immediately before in geo-location mode. For each detected tag, the range and azimuth positions of the tag relative to the SAR are recalled. For each azimuth sample, i, the range index $k_p(i)$ corresponding to the range bin containing that tag's peak echo is determined, and a one-dimension data vector, $\{D_i\}$, is selected, wherein i is again the azimuth sample, advancing across the aperture from 1 to $N_a/N_p$, and the value of the element $D_i$ equals the element of the matrix $[C_{ik}]$ evaluated at $k=k_p(i)$, multiplied by a Doppler phase-adjustment factor to account for changes in range of the target cell that occur as the SAR traverses the aperture.

A variety of encoding schemes are possible involving the relationship between the tag status information and the low-rate code sequence, $\{I\}$. For example, assume that a number of distinct and prescribed possible sequences $\{I\}_q$ have been defined, where q is an index denoting a particular possible sequence, and q advances from 1 to the total possible number of sequences, denoted P. Then each possible sequence can be considered to be a symbol. Now, in this case, decoding the message sent equates to determining which symbol sequence has been sent.

The symbol sent is determined by computing the correlation, or inner product, $F_q$, of $\{D_i\}$ and $\{I_i\}_q$, where the inner product is taken with respect to the azimuth-sample index, i, and is performed for all possible values of q=1, 2, ..., P. This correlation is computed as $$F_q = \sum_{i=1}^{N_a/N_p} D_i I_{iq}, q=1, 2, \ldots, P. \quad (1)$$

Herein, values of $D_i$ and $I_{iq}$ are expressed as either +1 (zero phase state) or −1 (pi phase state). The symbol index, q, for which $F_q$ is a maximum, is taken to be the index of the symbol communicated from the tag.

The specific sequences $\{I\}_q$, q=1, 2, ..., P must be chosen so that the cross-correlation between any particular pair of sequences, $\{I\}_m$ and $\{I\}_n$ is sufficiently small to prevent, for example, the sequence $\{I\}_m$ from producing a larger result from equation (1) than would $\{I\}_n$ when, in fact, $\{I\}_n$ was actually sent. Such an erroneous detection might result from a combination of ever-present thermal-noise voltages and a poor choice (i.e. large cross-correlation) of $\{I\}_m$ and $\{I\}_n$.

In the example given herein, any one of a total of P different symbols can be sent on a single aperture of radar pulses. Therefore, the effective number of bits $N_B$ communicated (bits are used to express a number in binary, positional notation) is $$N_B = \log 2(P).$$

In a preferred tag-system use scenario possibly involving multiple tags, the airborne or spaceborne SAR implements initial tag detection/location and tag uplink communications as two separate functional modes. In the first mode, geo-location mode, devoted strictly to initial detection and location of the tag or tags, the SAR creates a strip-map image covering a specified cross-track swath and oriented along a line parallel to the path of travel of the sensor platform (aircraft or satellite). The SAR is designed to be capable of forming two distinct types of strip maps of the imaged scene. One type is a strip map composed of images resulting from normal SAR image-formation processing. A second type is a strip map composed of pseudo-images resulting from processing via the novel technique used to discern and locate the tag or tags that may be present in the imaged scene. In the geo-location mode, the SAR sends signals that are interpreted by tags in the scene as commands instructing the tag to enter the geo-location mode. The downlink signals also establish a common timing base between the SAR and the tags, so that all can assign a common index to each and every radar pulse transmitted during the time the SAR illuminates the tag's antenna. In this mode, following prf-scale synchronization, all tags transmit or transpond using an identical, pre-defined geo-location pulse sequence for a finite, prescribed aperture of SAR pulses. The SAR forms a pseudo-image using matched-filter processing compatible with the geo-location pulse sequence sent by the tags. The tags can be detected in the pseudo-image either automatically, by the radar signal processor, using common constant-false-alarm-rate techniques, or by a human operator, who visually detects tag signatures by looking at an amplitude display of the pseudo-image and cues the SAR system as to their existence and locations. The position of each tag relative to other tags can be determined by measuring distances between distinct tag signatures in the pseudo-image. The position of each tag relative to real clutter features (natural features like trees, hills, or arroyos; or cultural features like buildings, roads, towers, or vehicles) appearing in the normal SAR image can be determined by overlaying the normal SAR image and the pseudo-image and measuring distances between each tag signature in the pseudo-image and real clutter features in the normal SAR image.

Once all tags in the imaged strip map have been detected and located, the SAR can initiate the second functional mode, uplink-communications mode. In this mode, the tags send status information up to the airborne or spaceborne SAR. In the uplink communications mode, the SAR sends signals that are interpreted by tags in the scene as commands instructing the tag to enter the uplink communications mode. As in geo-location mode, the downlink signals also establish a common timing base between the SAR and the tags. Following synchronization of the timing base, the tags send their status information to the SAR. This information is encoded in the radar echo as symbols, each symbol corresponding to one of a set of prescribed pulse sequences. The SAR processes the echo pulses from the imaged scene using a second, novel processing technique. Because, in uplink communications mode, the SAR processor has prior knowledge of the geographical position of all tags in the imaged scene, processing of the echo can be limited to the minimum required to extract uplink data from echo corresponding only to the known tag locations.

In the uplink-communications mode processing scheme, the SAR processor first performs a range-dimension transformation of all echo pulses of the prescribed aperture of pulses to achieve the ultimate resolution in this dimension. This is often referred to in the art as range-dimension pulse compression. From the resulting range-compressed data, only those range-cell data values known to correspond to a tag location need be processed further for the purpose of extracting uplink data. For each known tag location, a data vector of range-cell data values is selected from the two-dimensional data matrix (range and azimuth dimensions) of echo-data values. The vector of interest has one element for each echo pulse of the aperture of echo pulses to be used to process the uplink data. For each known tag location, the corresponding range-compressed data vector is then processed to determine its information content. The data extraction is performed using correlation processing. In this method, prescribed pulse sequences corresponding to each of the possible symbols sent are correlated with the tag data vector being processed. Sufficiently high correlation between the symbol sequence and all or a portion of the tag data vector reveals the presence of a particular symbol in the uplink message.

The rate at which symbols are sent is selectable. At the lowest rate, one symbol is sent on each prescribed aperture of pulses. At higher symbol rates, numerous symbols are sent on each prescribed aperture. The lower the symbol rate, the higher will be the processing gain achievable in the SAR signal processor. Higher processing gain improves clutter-reduction effectiveness of the processing and reduces size and power requirements on the tag electronics.

The system concept described herein intrinsically satisfies a "low probability of intercept" requirement. That is, it is nearly impossible for a person who is suitably equipped with rf intensity measurement equipment and who is in close proximity to an rf tag to determine that the tag is transmitting as it retransmits its modulated echoes to the SAR.

The invention will have invaluable application in the areas of arms treaty verification, battlefield management, precision strike, intelligence gathering, terrain mapping, and emergency response. In each case, the transponder provides a reference location marker and can also send data to the SAR. And in each case, miniaturization of the tag device, made possible by the novel methods described herein, will provide enhanced functionality in comparison to the present state of the art.

The foregoing description of the invention has been presented for purposes of illustration. It is not intended to be exhaustive or to limit the invention to the precise forms disclosed. Obvious modifications or variations are possible in light of the above teachings. The embodiments were chosen and described in order to best illustrate the principles of the invention and its practical application to thereby enable one of ordinary skill in the art to best utilize the invention in various embodiments and with various modifications as are suited to the particular use contemplated, as long as the principles described herein are followed. Thus, changes can be made in the above-described invention without departing from the intent and scope thereof. It is intended that the specification and the examples be considered as exemplary only, with the true scope and spirit of the invention being indicated in the following claims.

What is claimed is:

1. A transponding apparatus comprising:
   a) signal receiving means for receiving an illuminating signal from a radar source located on an airborne platform;
   b) frequency conditioning means coupled to said receiving means for phase-shifting said illuminating signal into a phase-shifted transponder signal; and
   c) transmitting means coupled to said frequency conditioning means for transmitting said phase-shifted transponder signal to an rf receiving means at said airborne platform;
   wherein said transponding apparatus is capable of amplitude-gating and phase-coding said phase-shifted transponder signal with a number of prescribed and/or informational pulse sequences for retransmission to said rf receiving means at said airborne platform.

2. The invention of claim 1, wherein illumination signals received by said transponding apparatus are phase-code modulated, pulse-by-pulse, by said frequency conditioning means using a prescribed code provided by said transponding apparatus.

3. The invention of claim 2, wherein said prescribed code is phase-shifted.

4. The invention of claim 1, further comprising a transponder status means coupled to said transmitting means for providing identifying and status information of said transponding apparatus to said rf receiving means of said airborne platform through said transmitting means of said transponder apparatus.

5. The invention of claim 4 wherein said information provided by said transponder status means is transmitted by said transmitting means in a phase-shifted state.

6. The invention of claim 1 wherein said airborne platform further comprises a synthetic-aperture radar comprising:
   a) illumination signal generation means for generating and transmitting said illuminating signals to be received by at least one transponder;
   b) said rf receiving means for receiving reflected radio frequency echo signals after said synthetic-aperture radar transmits said illuminating signals;
   c) signal processing means coupled to said rf receiving means wherein said echo signals are processed and demodulated using prescribed modulation sequences stored in a code-memory means; and
   d) code-memory means coupled to said signal processing means for storing said prescribed modulation sequences;
   wherein the total echo signal returned to said synthetic-aperture radar is processed by said processing means resulting in selective enhancement in a pseudo-image product resulting from said processing in combination with additional standard image-formation processing, of the echoes of at least one transponder apparatus, and resulting in the significant suppression of unwanted echoes due to clutter echo from stationary, natural, or cultural targets located in proximity to said at least one transponder apparatus.

7. The invention of claim 1 further comprising a single antenna used by said signal receiving means and said transmitting means for receiving and transmitting signals.

8. The invention of claim 1 further comprising a portable power source means for providing electrical power to said transponding apparatus.

9. A transponder apparatus comprising:
   a) illuminating radar signal receiving means for receiving an illuminating signal from a radar source;
   b) frequency conditioning means coupled to said illuminating radar signal receiving means for modulating said illuminating signal into a phase-shifted tag signal;
   c) code generator means for generating a prescribed code sequence in response to said illuminating signal;
   d) transponder status means coupled to said code generator means for providing status information unique to said transponder apparatus to an airborne-based platform through a transmitting means;
   e) mixing means, incorporated as part of said code generator means, for combining said prescribed code sequence with said status information to produce a sequence having a combination of prescribed and information content to be sent to said airborne platform by a transmitting means; and
   f) transmitting means for transmitting said identifying code signal and said identifying information to said airborne platform.

10. The invention of claim 9 further comprising a synthetic-aperture radar (SAR) fixed to said airborne-based platform, said SAR comprising:
    a) illumination signal means for transmitting said illuminating signals to said transponder apparatus;

b) rf receiving means for receiving radio frequency echo signals reflected from said ground surface;

c) first signal processing means coupled to said rf receiving means wherein prescribed modulation sequences, stored in a code memory means, identical to that used by said transponder apparatus, are mixed against echoes received by said rf receiving means providing despreading of incoming transponder echoes also received by said receiving means with said radio frequency echo signals reflected from said surface;

d) code memory means for storing said prescribed modulation sequences; and e) second signal processing means for correlation processing of said de-spread output signals from said first signal processing means.

11. The invention of claim 10 wherein echo azimuth samples are compressed in the range dimension, and azimuth-dimension tag-echo vector is selected for said correlation processing, element of which correspond to range bins in which said compressed tag echo is known to reside, and the cross-correlation of said vector with each of a number of possible informational-symbol sequences is sequentially computed, the symbol or symbols producing the highest cross-correlation being declared to be the symbol of symbols sent by the tag.

12. The invention of claim 10 further comprising a single antenna used by said illuminating radar signal receiving means and said transmitting means for receiving and transmitting signals.

13. The invention of claim 12 further comprising a portable power source means for providing electrical power to said transponding apparatus.

14. An rf transponder recognition and identification system comprising:

a) an rf transponder (tag) for receiving, modulating, and retransmitting rf pulses transmitted to said tag by a synthetic-aperture radar means, wherein said tag means is capable of amplitude-gating and phase-coding its echo with a number of prescribed and/or informational pulse sequences for retransmission to said synthetic-aperture radar means, said tag further comprising;

i) radar signal receiving means for receiving an illuminating signal from said SAR;

ii) frequency conditioning means coupled to said radar signal receiving means for phase-shifting said illuminating signal into a phase-shifted tag signal;

iii) transmitting means for transmitting rf signals to said SAR;

iv) code generator means for generating a prescribed code sequence for transmission to said SAR through said transmitting means;

v) tag status means coupled to said code generator means for providing identifying, environmental and 'status information of said tag to said SAR through said transmitting means; and vi) mixing means, incorporated as part of said code generator means, for combining said prescribed sequence with said status information to produce a sequence having a combination of prescribed and informational content to be sent by said transmitting means to said airborne SAR; and b) a synthetic-aperture radar (SAR) located on an airborne platform said SAR comprising:

i) illumination signal means for transmitting illuminating signals toward a ground surface from an airborne platform;

ii) rf receiving means for receiving radio frequency echo signals after said SAR transmits said illuminating signals to said surface;

iii) first signal-processing means coupled to said rf receiving means wherein echo signals are processed and demodulated using prescribed modulation sequences stored in a code-memory means and wherein prescribed modulation sequences, stored in a code memory means, identical to that used by said tag are mixed against echoes received by said rf receiving means providing processing of incoming tag echoes also received by said receiving means with said radio frequency echo signals reflected from said surface; and iv) code memory means coupled to said first signal processing means for storing said modulation sequences;

wherein the total echo signal returned to said synthetic-aperture radar is processed by said processing in combination with additional standard image-formation processing of the echoes of at least one transponder apparatus, and resulting in the significant suppression of unwanted echoes due to clutter echo from stationary, natural or cultural targets located in proximity to said at least one transponder apparatus.

15. The invention of claim 14 further comprising correlation signal-processing means for correlation processing of the de-spread and pre-filtered output of said second signal-processing wherein echo azimuth samples are compressed in the range dimension, and azimuth-dimension tag-echo vector is selected for correlation processing, elements of which correspond to range bins in which compressed tag echo is known to reside, and the cross-correlation of said vector with each of a number of possible informational symbols is sequentially computed, the symbol or symbols producing the highest cross-correlation being declared to be the symbol or symbols sent by said tag.

16. The invention of claim 14 wherein said identifying, environmental and status information of said tag is phase-shifted by said frequency conditioning means prior to transmission by said transmitting means.

17. The invention of claim 16 wherein said tag further comprises a single antenna used by said radar signal receiving means and said transmitting means for receiving and transmitting signals at said tag.

18. The invention of claim 17 further comprising a portable power source means for said tag for providing a self-contained electrical power source to said tag.

19. A method of detecting and locating a transponding apparatus comprising the steps:

a) an airborne platform-based synthetic-aperture radar transmits illuminating radar signals towards the earth's surface for receipt by ground-based transponder devices;

b) at least one transponding apparatus receives the illuminating signals through a receiving means;

c) said transponding apparatus filters and amplifies said illuminating signals;

d) said illuminating signals are decoded to identify downlink commands from said SAR wherein said commands contain information that allow said SAR and said transponder to obtain a common pulse index;

e) the illuminating signals pass through a time-gating circuit within said tag and into a time-delay device wherein said signals are delayed in time by an amount equal to a function of the duration of the pulse transmitted by the SAR;

f) the signals are provided to a transponder transmitter through a bi-phase modulator which impresses on the signals a prescribed phase code and changes the phase of the signals;

g) the signals are amplified at the transponder transmitter and are retransmitted back to the SAR in a phase-shifted state to identify the transponder's location;

h) the SAR receives the phase-shifted signals retransmitted by the transponder;

i) the signals received by the SAR are processed and filtered at a signal processing means; and j) a pseudo-image is formed on a screen allowing the transponder's location to be determined on said screen wherein clutter energy which is not phase-shifted appear at Doppler frequencies outside the frequency passband of the pre-filter and are not shown within said screen.

20. The method of claim 19 wherein identifying information and status information from said transponder are transmitted to said SAR through said transponder transmitter following location identification of said transponder.

21. The method of claim 20 wherein said identifying information and status information comprises a radio frequency signal that is phase-shifted prior to transmission through said transponder transmitter.

22. The method of claim 20 or 21, wherein said bi-phase modulator uses standard 0/pi phase coding on said signals prior to transmission.

23. The method of claim 20 wherein said transponder receives information through said receiving means and transmits information through said transmitting means using the same antenna.

24. A method of communicating identifying information and status information from a transponding apparatus to a synthetic aperture radar (SAR) following detection and location of said tag by said SAR, wherein:

a) an airborne platform-based SAR transmits illuminating radar signals toward the earth's surface for receipt by at least one ground-based transponding apparatus;

b) at least one transponding apparatus (tag) receives the illuminating signals through a receiving means;

c) said tag filters and amplifies the illuminating signals through a receiving means;

d) said illuminating signals are decoded to identify downlink commands from said SAR wherein said commands contain information that allows said SAR and said tag to obtain a common pulse index;

e) said illuminating signals pass through a time-gating circuit within said tag and into a time-delay device wherein said signals are delayed in time by an amount equal to a fraction of the duration of the pulse transmitted by the SAR;

f) said signals are provided to a tag transmitter through a bi-phase modulator which impresses on the signals a phase code containing both prescribed and informational content;

g) said signals are amplified at the tag transmitter and are retransmitted back to the SAR in a phase-shifted state;

h) said SAR receives said phase-shifted signals retransmitted by said tag;

i) said phase-shifted signals are processed and filtered by a signal processing means wherein the said prescribed-code portion of said phase-shifted signal is removed; and j) said phase-shifted signals are further processed to determine the information code sequence sent by the transponder.

25. The method of claim 24 wherein said further processing comprises range compression, vector selection, and correlation processing.

26. A method of recognizing a remote transponder on a display comprising the steps of:

a) sending an illuminating radar signal from a radar source on an airborne platform towards the earth's surface;

b) the illuminating radar signal is received at a remote transponder wherein the signal is filtered and processed by the remote transponder's signal processing means;

c) the illuminating signal is modulated within said signal processing means such that said illuminating signal is phase-shifted;

d) the phase-shifted signal is amplified and transmitted back to the airborne platform where the signal is received;

e) the phase-shifted signal is amplified and filtered at the airborne platform after it is received by a receiving means;

f) the phase-shifted signal is displayed on a screen means wherein the location of the transponder is indicated on said screen and clutter and noise that is not phase-shifted is not displayed on said screen after said filtering.

27. The method of claim 26 wherein identifying information and status information from said transponder are transmitted through said transponder transmitter to said airborne platform and received by said receiving means following after steps a through f are completed and the transponder location is determined.

28. The method of claim 27 wherein said identifying information and status information comprises a radio frequency signal that is phase-shifted prior to transmission through said transponder transmitter.

29. The method of claim 26, wherein said bi-phase modulator uses standard 0/pi phase coding on said signals prior to transmission.

30. The method of claim 26 wherein said transponder receives information through said receiving means and transmits information through said transmitting means using the same antenna.

31. A method of communicating identifying information from a transponding means to an airborne-based monitor, comprising:

a) a transponding apparatus receives an illuminating signal through a receiving means;

b) the illuminating signal is filtered and amplified by said transponding apparatus;

c) the illuminating signal is decoded to identify commands from said airborne-based monitor which allow said transponding apparatus and said airborne-based monitor to obtain a common pulse index; and d) identification signals unique to said transponding apparatus are amplified and retransmitted by said transponding apparatus using said common pulse index to said airborne-based monitor in a phase-shifted state.

32. The method of claim 31 wherein:

e) said identification signals are received by said airborne-based monitor;

f) said identification signals are processed and filtered by a signal processing means at said monitor wherein the said prescribed code of said identification signal is removed; and g) said identification signals are further processed to determine the informational content of said identification signals.

33. The method of claim 32 wherein said airborne-based monitor transmits said illuminating signals received by said transponding apparatus.

* * * * *

UNITED STATES PATENT AND TRADEMARK OFFICE
CERTIFICATE OF CORRECTION

PATENT NO. : 5,486,830
DATED : January 23, 1996
INVENTOR(S) : Robert M. Axline, Jr., et al.

It is certified that error appears in the above-identified patent and that said Letters Patent is hereby corrected as shown below:

In column 1, lines 39, 52, 55, and 56, replace the word "tile" with --the--.

In column 3, line 7, replace the word "innoculates" with --modulates--; in line 9, replace the word "fine" with --the--; and in lines 27 and 28, replace the word "tile" with --the--.

In column 4, line 10, replace ",nixing" with the word --mixing--.

In column 5, line 14, delete the word "all" and replace with --an--.

In column 6, Line 25, delete the word "hi-phase" and replace with --bi-phase--.

In column 8, line 4, delete "A periodic" and replace with one word --Aperiodic--.

In column 9, line 41, after "than would" replace "$\{I\}_m$" with --$\{I\}_n$--; and at line 51 replace "$N_B=\log 2(P)$" with the equation --$N_B=\log_2(P)$--.

Signed and Sealed this

Twenty-fourth Day of December, 1996

Attest:

BRUCE LEHMAN

Attesting Officer   Commissioner of Patents and Trademarks